_United States Patent Office_ 2,750,352
Patented June 12, 1956

2,750,352

POLYSULFONE STABILIZED WITH HYDROGEN SULFIDE - VINYLCYCLOHEXENE REACTION PRODUCT AND STABILIZED POLYSULFONE PRODUCT

Robert J. Fanning, Bartlesville, and Asa Clarence Dees, Cushing, Okla., assignors to Phillips Petroleum Company, a corporation of Delaware No Drawing. Application December 9, 1952,
Serial No. 325,034

10 Claims. (Cl. 260—45.5)

This invention relates to resinous compositions derived from sulfur containing compounds and olefinic hydrocarbons.

In one of its aspects the invention is concerned with the stabilization against thermal decomposition of polysulfone resins. In another aspect the invention is concerned with the stabilization of polysulfone resins employing selected sulfur containing compounds. In a further aspect the invention is concerned with preparation of compositions of resins having improved characteristics in respect of thermal stability, for example, a polysulfone resin in composition with a selected sulfur containing compound which can be prepared by reaction of 4-vinyl-1-cyclohexene and hydrogen sulfide. Certain liquid as well as solid reaction products which are obtained can be used.

The preparation of certain compositions derived from hydrogen sulfide and 4-vinyl-1-cyclohexene and the compositions thus obtained are described and claimed in copending application for patent Serial Number 308,501, filed September 8, 1952, by Asa C. Dees.

The preparation of certain compositions derived from hydrogen sulfide and 4-vinyl-1-cyclohexene and the compositions thus obtained are also described and claimed in copending application Serial Number 308,715, filed September 8, 1952, by James E. Pritchard and Frederick M. Smith.

The preparation of polysulfone resins derived from organic compounds and sulfur dioxide is known in the art. The preparation of polysulfone resins by emulsion polymerization is described and claimed in copending application for patent Serial Number 8755, filed February 16, 1948, by W. W. Crouch and E. W. Cotten, now Patent No. 2,686,171, granted August 10, 1954. Further the preparation of resinous reaction products derived from sulfur dioxide and mixtures of certain olefinic compounds is described and claimed in F. E. Frey and R. D. Snow Patent 2,112,986, issued April 5, 1938. Still further a catalytic preparation of resinous reaction products of sulfur dioxide and olefins is described and claimed in L. H. Fitch and F. E. Frey Patent 2,128,932, issued September 6, 1938. Also A. K. Scribner and F. W. Wilder Patent 2,453,039, issued November 2, 1948, describes and claims still another process for the production of polysulfone resins. Thus, it is seen that the preparation of polysulfone resins is well known. The present invention, as stated, relates to the polysulfone resins which are obtained as described in the patents and applications mentioned and generally to such resins prepared according to prior art methods such as bulk or emulsion polymerization.

The thermal decomposition of polysulfone resins is known to be a problem, for example, in the molding of such resins. The stabilization of so-called olefin-sulfur dioxide or polysulfone resins and the stable resins produced are described and claimed in copending application, Serial Number 204,070, filed January 2, 1951, by W. W. Crouch and J. F. Howe, now Patent No. 2,643,241, June 23, 1953. In said last mentioned application, organic mono- and polysulfides are described and claimed in the stabilization of polysulfone resins. In copending applications Serial Number 208,853, filed January 31, 1951, by said W. W. Crouch and J. F. Howe, now Patent No. 2,599,544, June 10, 1952, sulfur and inorganic sulfides are described and claimed in the stabilization of polysulfone resins.

It has now been found that not only the aforesaid materials will act to stabilize polysulfone resins against thermal decomposition but that certain products derived from hydrogen sulfide and 4-vinyl-1-cyclohexene are suited to this purpose. Some of the products derived from hydrogen sulfide and 4-vinyl-1-cyclohexene are resins or resinous in character, as described in said applications, Serial Numbers 308,501 and 308,715. Therefore, it is now possible to prepare thermally stabilized polysulfone resins not containing any non-resinous materials. The advantages of these new compositions are at once apparent, especially in the light of a consideration of product characteristics desirable in resins.

According to this invention there are provided a stabilized polysulfone resin product containing a reaction product of 4-vinyl-1-cyclohexane and hydrogen sulfide and a method for preparing the same which comprises dispersing said reaction product throughout the mass of said polysulfone resin.

The reaction products of 4-vinyl-1-cyclohexene with hydrogen sulfide, which are employed as stabilizing agents for polysulfone resins, according to the present invention, are readily prepared by the interaction of hydrogen sulfide with 4-vinyl-1-cyclohexene in the presence of an acid-type catalyst such as boron fluoride-water, boron fluoride-hydrogen fluoride, boron fluoride-phosphoric acid, hydrogen fluoride, and the like. The reactants, i. e., the hydrogen sulfide and 4-vinyl-1-cyclohexene can be in the range from 1:1 to 6:1, in the presence of the catalyst, at a temperature in the range from 0 to 125° F. After addition of the reactants to the catalyst, a period of from 10 to 30 minutes is allowed for the reaction to continue. The temperature is then increased to 250 to 300° F. for a period generally in the range from one to two hours after which the reactor contents are cooled, the catalyst separated, and the reaction products recovered from unreacted vinylcyclohexene. Vinylcyclohexanethiols, liquid and resinous 4-vinyl-1-cyclohexene-hydrogen sulfide reaction products, including a solid resin are obtained. The preparation of these reaction products of 4-vinyl-1-cyclohexene with hydrogen sulfide is more fully described in said copending application Serial No. 308,501, filed September 8, 1952, by Asa C. Dees.

Also reaction products of 4-vinyl-1-cyclohexene with hydrogen sulfide, which are employed as stabilizing agents for polysulfone resins, according to the present invention, can be prepared in the presence of a solid contact catalyst. Thus, as more fully set forth and described in Serial Number 308,715, filed September 8, 1952, a vinylcyclohexanethiol can be prepared employing a catalyst such as an acid-treated clay, e. g. acid-treated montmorillonite, subbentonite clay (Super Filtrol) or silica-alumina.

The reaction conditions for the hydrogen sulfide-vinylcyclohexene reaction are substantially as follows: a mol ratio of hydrogen sulfide to vinylcyclohexene in the range 1:1 to 6:1, preferably 1.5:1 to 6:1; a temperature in the range 150–300° F., preferably 200–300° F.; a pressure in the range of 500–200 p. s. i. g., preferably 700–1500 p. s. i. g.; a space velocity in the range of 0.1 to 10, preferably 0.5 to 2 liquid volumes of reactants per volume of catalyst per hour. It is essential that the reaction be conducted in the substantial absence of oxygen in order to prevent side reactions, such as organic sulfide formation. The vinylcyclohexanethiol can be recovered from the reaction effluent by vacuum distillation. It can be further purified by the formation of the cadmium mercaptide and subsequent decomposition thereof.

Also, vinylcyclohexanethiol polymers are prepared employing catalysts selected from the group of polymerization catalysts consisting of acid-treated clays, such as acid-treated montmorillonite, subbentonite clay; sicila-alumina; and mixtures of glacial acetic acid with an oxygen-yielding material such as an alkali-metal persulfate or perborate or with an organic peroxide compound such as a peroxide of a hydroperoxide, e. g. benzoyl peroxide, t-butyl hydroperoxide, etc. The conditions for the polymerization when a solid catalyst is used are a temperature in the range of 70–325° F., preferably 100–300° F., and more preferably 150–300° F.; a pressure in the range of 0–2000 p. s. i. g., preferably 500–2000 p. s. i. g.; and a liquid hourly spaced velocity in the range of 0.1 to 10, preferably 0.5 to 2 volumes of reactants per volume of catalyst. The molecular weight of the polymeric thioethers depends on the specific temperature and pressure of the polymerization reaction. Generally, higher pressures and lower temperatures in the disclosed ranges favor the formation of polymers having high molecular weight.

When a mixture of acetic acid and oxygen-yielding compound is used as a catalyst for polymerizing vinylcyclohexanethiol, the amount of oxygen-yielding compound used is in the range of 0.2 to 2.5 moles per mole of vinylcyclohexanethiol. When the oxygen-yielding compound is one such as potassium persulfate, it is preferred that an excess over that required to saturate the glacial acetic acid be used. In such a reaction, the temperature is ordinarily in the range of 100° F. to the boiling point of glacial acetic acid at the pressure of the reaction.

The products described in Serial Number 308,501, filed September 8, 1952, range from light yellow to dark colored viscous liquids to a glassy solid which is a deep amber color by transmitted light and dark reddish-brown by reflected light. The solid is easily fractured and can be readily ground to give a yellow powder. These materials have a sulfur content not exceeding 20 per cent by weight and the preferred products have a sulfur content in the range between 3 and 10 per cent by weight.

The vinylcyclohexanethiols described in Serial Number 308,715, filed September 8, 1952, are liquids with a boiling point of 98–101° C. at 35 mm. Hg and a refractive index, $N_D^{20}$ of 1.5106. The polymeric thioethers of Serial Number 308,715, filed September 8, 1952, range from light yellow oils to hard resins varying in color from yellow to brown. The light yellow oils boil in the range 82–177° C. at 10 mm. Hg.

The 4-vinyl-1-cyclohexene-$H_2S$ stabilizer material can be incorporated with the polysulfone resin in a number of ways, the important factor being that the stabilizer be intimately mixed with the polysulfone resin. The stabilizer can be added to the powdered resin as a solution in a suitable solvent and the mixture stirred and warmed until the solvent evaporates. Another procedure is to add the stabilizer, when it is a solid, in powdered form to the dry resin and mix by any means such as a ball mill, roll mill, or the like. An aqueous dispersion of the stabilizer can be added to the dry resin and the water evaporated while the mixture is stirred. Still another method comprises adding an aqueous dispersion of the stabilizer to a polysulfone latex. The stabilizer is incorporated with the resin upon coagulation of the latex. This method is particularly applicable when the olefin-$SO_2$ resin is prepared by emulsion polymerization.

The quantity of solid vinylcyclohexene-$H_2S$ reaction product required to effect a desired degree of stabilization of polysulfone resins is generally in the range from 0.5 to 15 per cent, based on the weight of the resin.

*Example I*

A polysulfone resin was prepared by the interaction of 1-butene with sulfur dioxide in accordance with the following recipe:

| | Parts by weight |
|---|---|
| 1-butene [1] | 46.7 |
| Sulfur dioxide | 88.3 |
| Water | 220 |
| Ammonium nitrate | 0.5 |
| Maprofix MM [2] | 1.0 |

[1] A product of technical grade containing not less than 95 mol per cent 1-butene.
[2] Sodium lauryl sulfate dispersing agent commercially available in the form of a paste containing about 60 per cent solids.

The reaction was effected at a temperature of approximately 87° F. and a pressure of 65 pounds per square inch gage. After an 8.5-hour reaction period the excess sulfur dioxide was vented. The latex was coagulated by the addition of 3 liters of 20 per cent sodium chloride solution followed by heating the mixture to 130° F. and then cooling it to 100° F. The coagulated resin was filtered, washed with water, and dried 48 hours at 150° F.

A solid reaction product of 4-vinyl-1-cyclohexene with hydrogen sulfide was prepared in the following manner: A reaction was charged with 2.8 pounds of boron fluoride-water catalyst, and 5.58 pounds of a blend of 4-vinyl-1-cyclohexene and hydrogen sulfide in an olefin: $H_2S$ mol ratio of 1:2 was introduced at a rate of 837 cc. per hour. The charging time was 2.75 hours. The mixture was stirred during charging of the olefin-$H_2S$ blend and for 15 minutes thereafter. The temperature ranged from 50 to 104° F. An external cooling means was provided since the reaction was exothermic. Agitation was discontinued and the reaction mixture was allowed to stand at room temperature for about two hours during which time the temperature increased to 273° F. The mixture was then cooled to room temperature and treated with ether and water. The ether-soluble portion was washed with water to remove the catalyst after which the ether was distilled. The dark reddish-brown liquid which remained was distilled at a pressure of 10 mm. mercury to remove unreacted 4-vinyl-1-cyclohexene, vinylcyclohexanethiols, and a light yellow, liquid resinous material. The latter resinous material distilled at 320–460° F. at 10 mm. mercury. The kettle product was a glassy solid which was a deep amber color by transmitted light and dark reddish-brown by reflected light. The solid was easily fractured and readily ground to give a yellow powder. This product was found to contain 4.24 weight per cent sulfur.

The solid vinylcyclohexene-$H_2S$ reaction product was employed as a stabilizer for the butene-$SO_2$ resin hereinbefore described. An approximately 4 weight per cent solution of the vinylcyclohexene-$H_2S$ reaction product in benzene was added to the dry, powdered butene-$SO_2$ resin in a quantity such that 2 per cent of the stabilizer, based on the weight of the resin, was employed. The mixture was exposed to the air and stirred for about 45 minutes. The temperature was maintained at 104–122° F. during this period. At the end of this time the major portion of the benzene had evaporated. The remaining material was then dried at 120° F. for about 16 hours to remove the last traces of benzene. Samples of the dry mixture of butene-$SO_2$ resin and stabilizer were heated at 375° F. for test periods of 0.5, 1, and 2 hours, and the loss in weight of the resin at the end of each test period was determined in order to provide a measure of the thermal decomposition that took place. Controls were run in each case using the butene-$SO_2$ resin without a stabilizer. The following results were obtained:

| | Weight Loss at End of Test Period, Percent | | |
|---|---|---|---|
| | 0.5 Hour | 1 Hour | 3 Hours |
| Stabilized Resin | 6.7 | 10.3 | 19.1 |
| Control | 19.6 | 27.2 | 40.2 |

The results of the stabilization tests show that after 0.5 hours only about one-third as much decomposition occurred of a stabilized resin of the invention as occurred of the non-stabilized control polysulfone.

*Example II*

A blend of 4-vinyl-1-cyclohexene and hydrogen sulfide in a mol ratio of 1:2 was brought into contact with a Super Filtrol catalyst which had previously been dried for 10 hours in an atmosphere of nitrogen at a temperature ranging from 200–250° F. The volume of catalyst in the reactor was 1000 ml. The feed, consisting of hydrogen sulfide in solution in 4-vinyl-1-cyclohexene, was forced through the reactor by applying nitrogen under pressure to the feed tank. The reactor effluent was distilled, at first, at atmospheric pressure at a reflux ratio of 10/1. The distillation was finished at pressures ranging from 560 to 240 mm. of mercury. This method of operation kept the kettle temperature below 200° F. The following table shows the reaction conditions, quantities of materials used, and products obtained:

Reaction conditions:
    Temperature range, °F_____ 150–225
    Pressure, p. s. i. g_____ 800
    Space velocity, liq. vol./vol. cat./hr_____ 2

Composition of charge, lb.:
    4-vinyl-1-cyclohexene _____ 21.6
    Hydrogen sulfide_____ 13.6
        Total _____ 35.2

Product distillation:
    Charge to still, lb_____ 19.046
    Recovery, lb.—
        Light material_____ 0.065
        4-vinyl-1-cyclohexene _____ 16.832
        Bottoms_____ 2,054
        Total _____ 18.951
    Loss _____ 0.095

The bottoms product was purified by distillation under reduced pressure. After removing the light ends, four liquid samples having different boiling points were selected to be tested as stabilizers for a 1-butene-sulfur dioxide resin. The refractive index and boiling point of each sample is given below:

| Sample No. | Boiling Point | n20/D |
|---|---|---|
| 1 | 98.5 (35 mm. Hg) | 1.5093 |
| 2 | 92 (10 mm. Hg) | 1.5175 |
| 3 | 121 (10 mm. Hg) | 1.5345 |
| 4 | 177 (10 mm. Hg) | 1.5278 |

(Sample 1 is vinylcyclohexanethiol and samples 2, 3, and 4 are polymeric materials.)

Each of the above-described samples was dissolved in benzene and added to portions of the dry, powdered butene-$SO_2$ resin in a quantity such that 2 per cent of the stabilizer, based on the weight of the resin, was employed. The mixtures were exposed to the air and stirred for about 45 minutes. The temperature was maintained at 104–122° F. during this period. At the end of this time the major portion of the benzene had evaporated. The remaining material was then dried at 120° F. for about 16 hours to remove the last traces of benzene. The samples were then heated at 375° F. for test periods of 0.5, 1, and 3 hours, and the loss in weight of the resin at the end of each test period was determined in order to provide a measure of the thermal decomposition that took place.

A control was run using the butene-$SO_2$ resin without a stabilizer. The following results were obtained:

| Sample No. | Weight Loss at End of Test Period | | |
|---|---|---|---|
| | 0.5 Hour | 1 Hour | 3 Hours |
| 1 | 2.8 | 4.8 | 12.0 |
| 2 | 2.1 | 3.8 | 13.1 |
| 3 | 1.6 | 3.0 | 10.4 |
| 4 | 2.6 | 4.3 | 11.5 |
| Control | 11.5 | 16.1 | 25.2 |

*Example III*

A 1-butene-$SO_2$ resin was prepared in accordance with the procedure given in Example I except that the temperature was 100° F. and the reaction period was 4.83 hours. At the end of the reaction period, the excess sulfur dioxide was vented and the latex coagulated by the addition of a 20 weight per cent aqueous solution of sodium chloride using 1 part of sodium chloride solution to 2 parts of latex. Approximately 1.5 parts by weight of water was then added per part by weight of the mixture after which the material was heated to 125° F. The coagulated resin was separated from the liquid, washed with water, and dried in air at 130–150° F. for 16 hours.

5-methoxy-2-benzimidazolethiol, which is not within the scope of the present claims, was dissolved in methanol and this solution added to a portion of the dry, powdered butene-$SO_2$ resin, prepared as described above, in a quantity such that 2 per cent of the thiol, based on the weight of the resin, was employed. The solvent was evaporated and the mixture then heated at 375° F. for test periods of 0.5, 1, and 3 hours, and the loss in weight of the resin at the end of each test period was determined in order to provide a measure of the thermal decomposition that took place. A control was run using the butene-$SO_2$ resin without a stabilizer. The following results were obtained:

| | Weight loss at end of test | | |
|---|---|---|---|
| | 0.5 hrs. | 1 hr. | 3 hrs. |
| Resin—5-methoxy-2-benzimidazolethiol | 15.6 | 42.9 | 54.5 |
| Control | 12.8 | 18.3 | 30.5 |

Variation and modification are possible within the scope of the foregoing disclosure and appended claims to the invention, the essence of which is that admixture of an $H_2S$-4-vinyl-1-cyclohexene reaction product with a polysulfone resin results in the thermal stabilization of said polysulfone resin.

We claim:
1. A stabilized polysulfone resin formed by reacting an unsaturated organic compound with sulfur dioxide containing admixed therewith about .5 to 15 per cent by weight of said polysulfone resin of a reaction product of 4-vinyl-1-cyclohexene with hydrogen sulfide, the said product being selected from the group consisting of vinyl-cyclohexanethiol, a liquid polymeric thioether and a solid resinous material.

2. A stabilized polysulfone resin according to claim 1 in which the product admixed therewith contains about 4.2 per cent by weight of sulfur, has a glassy deep amber color by transmitted light, has a dark reddish-brown color by reflected light and is easily fractured and readily ground to give a yellow powder.

3. A product according to claim 1 in which the polysulfone resin is a 1-butene $SO_2$ resin.

4. A product according to claim 2 in which the polysulfone resin is a 1-butene $SO_2$ resin.

5. A stabilized polysulfone resin formed by reacting an unsaturated organic compound with sulfur dioxide containing admixed therewith in an amount effective to stabilize said resin a polymeric liquid obtained upon catalytic reaction of 4-vinyl-1-cyclohexene with hydrogen sulfide and having a boiling point in the range 92–177° C. at 10 mm. mercury.

6. A stabilized polysulfone resin formed by reacting an unsaturated organic compound with sulfur dioxide containing admixed therewith in an amount effective to stabilize said resin at least a portion of a polymeric liquid obtained by reaction of 4-vinyl-1-cyclohexene and hydrogen sulfide in the presence of a subbentonite catalyst at a temperature in the range 200–250° F.

7. A stabilized polysulfone resin composition which comprises a polysulfone resin formed by reacting an unsaturated organic compound with sulfur dioxide which tends to decompose when heated and a reaction product obtained from a reaction between hydrogen sulfide and 4-vinyl-1-cyclohexene in the presence of a catalyst.

8. A stabilized polysulfone resin composition which comprises a polysulfone resin formed by reacting an unsaturated organic compound with sulfur dioxide which tends to decompose when heated and a solid resinous reaction product of hydrogen sulfide and 4-vinyl-1-cyclohexene obtained by reaction of hydrogen sulfide and 4-vinyl-1-cyclohexene in the presence of an acid-type catalyst, the said reaction product being recovered from the mass resulting upon reaction of the hydrogen sulfide and the 4-vinyl-1-cyclohexene by extracting the reaction mixture with ether and water, washing the ether extract with water to remove catalyst employed in the reaction, and distilling to remove all materials distilling over up to a temperature of about 460° F. at 10 mm. mercury, the said reaction product remaining as a kettle product of the said distillation.

9. A stabilized polysulfone composition which comprises a polysulfone resin formed by reacting an unsaturated organic compound with sulfur dioxide which tends to decompose when heated and a solid reaction product of 4-vinyl-1-cyclohexene with hydrogen sulfide in the presence of boron fluoride-water catalyst at a temperature in the approximate range of 50 to 105° F., allowing the reaction mixture thus obtained to stand for about 2 hours and its temperature to increase during said time, then cooling and treating said reaction mixture with ether and water, washing the ether-soluble portion with water to remove the catalyst, distilling the ether, distilling a reddish-brown liquid obtained to remove all materials coming over up to a temperature of about 460° F. at 10 mm. mercury, recovering as kettle product of said distillation a dark reddish-brown glassy solid, as viewed by reflected light, containing approximately 4.2 weight percent sulfur and admixing with said polysulfone resin from about 0.5 to about 15 percent, based on the weight of said polysulfone resin, of said kettle product.

10. A method of heat molding a polysulfone resin which has been formed by reacting an unsaturated organic compound with sulfur dioxide and which tends to decompose when heated, which comprises incorporating therewith a reaction product obtained from a reaction between hydrogen sulfide and 4-vinyl-1-cyclohexene in the presence of a catalyst and then heat molding said resin.

No references cited.